Oct. 11, 1966    F. C. OWEN    3,278,833
CORE TYPE A.C. WELDING TRANSFORMER
Filed Oct. 22, 1965    3 Sheets-Sheet 1

INVENTOR.
FREDERICK C. OWEN

BY *Garvey & Garvey*
ATTORNEYS.

Oct. 11, 1966  F. C. OWEN  3,278,833
CORE TYPE A.C. WELDING TRANSFORMER
Filed Oct. 22, 1965  3 Sheets-Sheet 2

INVENTOR.
FREDERICK C. OWEN
BY Garvey & Garvey
ATTORNEYS.

Oct. 11, 1966  F. C. OWEN  3,278,833
CORE TYPE A.C. WELDING TRANSFORMER
Filed Oct. 22, 1965  3 Sheets-Sheet 3

INVENTOR
FREDERICK C. OWEN
BY Garvey & Garvey
ATTORNEYS 3,278,833
CORE TYPE A.C. WELDING TRANSFORMER
Frederick C. Owen, 204 Fenton Place, Charlotte, N.C.
Filed Oct. 22, 1965, Ser. No. 500,883
14 Claims. (Cl. 323—51)

This invention relates broadly to A.C. welding transformers and more particularly to a core type welding transformer having a shell-type reactance winding connected in the welding circuit about a movable shunt for fine adjustment of the welding current.

One of the objects of the present invention is to provide a construction of core type A.C. welding transformer in which the welding arc is easy to strike and maintain on all metals for flat, vertical and overhead welding, on dry and wet surfaces, and surfaces submerged in water.

Another object of the invention is to provide a construction of core type welding transformer which can weld ferrous metals while a stream of water is spurting on the welding arc, and which can be used to repair holes in tanks, boilers, pipes, etc., while water is issuing therefrom.

Another object of the invention is to provide a construction of core type welding transformer which utilizes the magnetic leakage flux with a reactance winding at one end of the transformer to produce improved arc characteristics.

Still another object of the invention is to provide a construction of core type welding transformer having a current regulating shunt or flux diverter in which the entire core is energized under load, and in which the flux travels the complete core when the welder is idling.

A further object of the invention is to provide a core type welding transformer having a shell-type reactance winding in the welding circuit in which the windings are distributed over a substantial portion of the iron core reducing the required amount of copper to a minimum and providing improved heat dissipation characteristics.

Still a further object of the invention is to provide a relatively small and compact A.C. welding transformer which is simple in construction and is easily adaptable to mass production techniques.

Other and further objects of the invention reside in the placement of the reactance winding whereby it performs as a tuned circuit, the placement of the reactance winding whereby a single mutual flux path is provided between the primary-secondary windings and the reactance winding, the manner in which leakage flux from the transformer is eliminated from all practical standpoints, and other and further objects will become apparent, to one skilled in the art, from the specification hereinafter following by reference to the accompanying drawings, in which.

Figure 1:
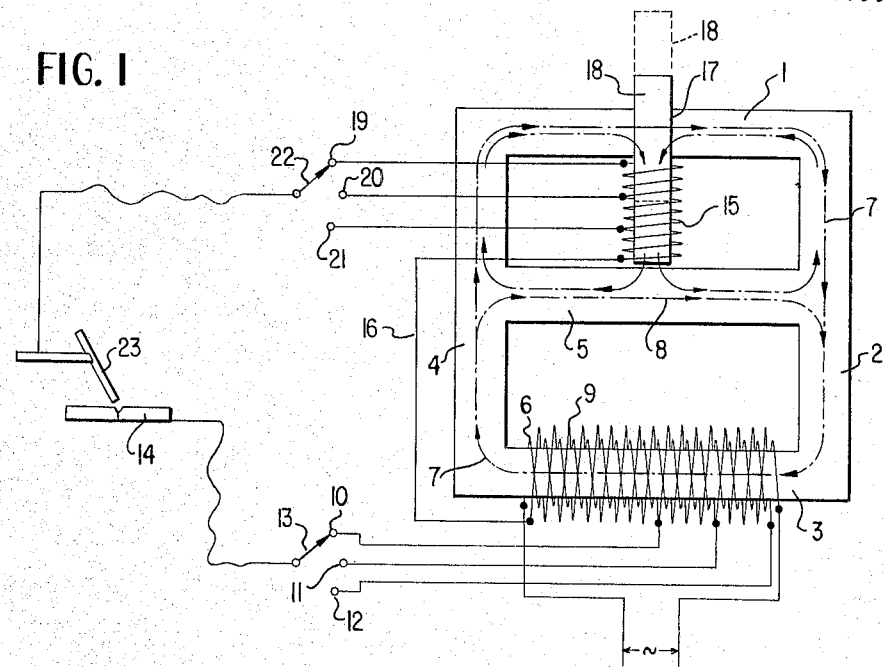
FIG. 1 is an electrical schematic diagram of a core type A.C. welding transformer constructed in accordance with the teachings of the invention, with an adjustable position of the flux diverter shown in dotted lines.

The simplest form of the transformer of the invention is shown in FIG. 1, wherein the generally rectangular laminated core constructed of paramagnetic material is comprised of outer leg portions 1, 2, 3 and 4 sequentially connected at their ends to form a rectangular core. Intermediate leg portion 5, disposed substantially midway between and parallel with outer leg portions 1 and 3, is connected transverse of the core between outer side leg portions 2 and 4. A primary transformer winding 6 connected to a suitable source of A.C. power is wound on outer leg portion 3 to produce an A.C. magnetic flux path, as indicated at 7, through the outer core leg portions and a similar flux path 8 in one direction through intermediate leg portion 5 when the primary winding is connected to the A.C. power source.

Secondary winding 9 is inductively coupled with primary winding 6 and is wound on the same outer core leg portion 3 with the primary winding. As indicated, the primary and secondary windings may be concentrically wound on the core. Secondary winding 9 is provided with a plurality of voltage taps 10, 11 and 12 connected to one end thereof for selective electrical connection with the movable tap or plug 13 connected to the work 14, for varying the number of turns of the secondary winding placed in the welding circuit and the open-circuit voltage. The opposite end of secondary winding 9 is connected to one end of reactance winding 15 by conductor 16.

A gap 17 is provided in outer core leg portion 1, substantially centrally thereof with a movable shunt flux diverter 18 slidably connected therein for movement toward and away from intermediate leg 5. In FIG. 1 the shunt is shown in full lines adjusted inwardly toward the intermediate leg to form a magnetic flux path between outer leg portion 1 and the intermediate leg 5, substantially midway between outer leg portions 2 and 4, while the shunt has been shown in a withdrawn position in dotted lines.

Reactance winding 15 is connected in a stationary position between outer leg portion 1 and intermediate leg 5 in alignment with the gap and about the shunt or flux diverter 18, such that the shunt is adjustable to move in and out of the center of winding 15.

The opposite end of reactance winding 15 is provided with a plurality of current adjusting taps 19, 20 and 21 which are adapted for selective electrical connection with the movable tap or plug 22 connected to the welding electrode 23 to complete the welding circuit. Selective connection of movable tap 22 with the stationary taps 19, 20 and 21 correspondingly places more or fewer turns of reactance winding 15 in the welding circuit. As more turns of winding 15 are placed in the circuit the welding current is reduced so that the lowest welding current is obtained when movable tap 22 is connected with stationary tap 19. A higher welding current is obtained when fewer turns of winding 15 are connected in the circuit, such that in the present transformer the highest current is obtained when taps 22 and 21 are connected.

In operation and by way of example, if primary winding 6 is energized by a source of 220 volts A.C., the open-circuit voltage of taps 10, 11 and 12 may be approximately 42 volts, 70 volts and 95 volts, respectively. These will also be the open-circuit voltages across the circuit leads connected to the work and welding electrode. With taps 22 and 19 connected, when the welding arc is struck the welding current may be adjusted in the approximate range of 25 amperes to 300 amperes by moving the shunt from the fully inserted position as shown in full lines in FIG. 1 to the fully withdrawn position. It is to be understood that the shunt remains in the gap 17 in the fully withdrawn position. Thus the welding current is increased as the shunt or flux diverter is moved away from intermediate leg 5. As the shunt is moved inwardly more flux is diverted from outer core leg portion 1 to the intermediate leg through the shunt, causing more flux lines to be linked with reactance winding 15. The reactance winding acts as a transformer primary winding once the arc is struck and sets up a voltage component that exceeds the voltage across the arc, and its own flux paths as indicated in FIG. 1. The magnetic flux paths produced by the reactance winding and the flux paths 7 and 8 produced by the primary winding intermingle in a manner not completely understood to produce a smoother and more flexible arc than heretofore obtainable, and an arc which is easier to strike and maintain on all types of metals. It has been found that the arc produced by the present welding transformer can be easily struck and maintained on overhead, vertical and flat surfaces, on surfaces which are either wet or dry, and can be struck and maintained under water, or adjacent and in an aperture from which water is spurting such as in a tank, boiler, pipe or the like.

The core type welding transformer of the present invention has the advantage of a flux leakage effect and the reactance winding is an integral part of the welder disposed in a position whereby the leakage effect may be used to the greatest advantage. The primary and secondary windings are mounted on an outer leg portion, such as the bottom leg portion, and if the core did not have the upper extension including upper leg portion 1 and the upper ends of outer side leg portions 2 and 4, the welder would be a magnetic leakage transformer having considerable magnetic flux leakage when under load, and such a transformer would be impossible to accommodate in a metal case without shortcircuiting the transformer. The transformer of the present invention can easily be accommodated within a metal case without any adverse effects. The extension of the upper portion of the core to accommodate the reactance winding 15 apparently confines all of the magnetic leakage flux within the core, particularly in the upper portion of the core, and the adjustable shunt 18 is operable to force some of the leakage flux down to the intermediate leg 5 to form the flux path intermediate the outer side leg portions 2 and 4 which links the leakage flux with the reactance winding connected in the welding circuit to provide an easy and convenient control of the output welding current. From all practical standpoints the present core construction with the windings disposed in the manner set forth leakage flux is completely eliminated. When the reactance winding is energized upon striking the arc, the reactance winding itself sets up magnetic flux paths within the core to coact with the magnetic leakage flux path produced by the primary winding, in a manner not completely understood.

When movable plug 22 is electrically connected with tap 20 in the example previously set forth, the welding current is adjustable in a range of approximately 40 amperes to 500 amperes as the shunt 18 is adjusted from the full inward position, as indicated in full lines, toward the fully retracted position as indicated in dotted lines. When movable tap 22 is electrically connected with tap 21 the welding current is adjustable in a range of approximately 50 amperes to 600 amperes by withdrawing the plug from the full inward position. It is thus to be noted that a lower welding current is obtained as more turns of the reactance winding 15 are inserted in the welding circuit with the secondary winding. Also, a lower welding current is obtained as the shunt is adjusted toward its innermost position which links more flux lines with the reactance winding.

In the machine of the present disclousre there is only a slight difference between the shortcircuit current and the welding current and, as indicated, the adjustable taps enable selection of the desired welding current range while the adjustable shunt provides selection of a desired current within that range to give a better regulated output current which is best suited for a particular job. Adjustable taps are also provided for selection of the desired open-circuit voltage of the welding circuit.

Figure 2:
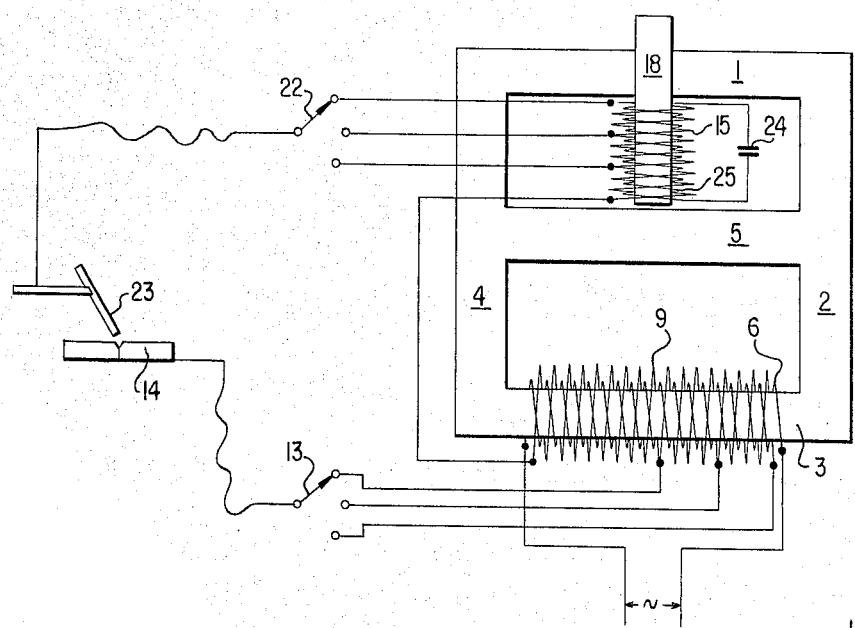
FIG. 2 is an electrical schematic diagram showing a modified form of the transformer of FIG. 1.

A modified form of the A.C. welder of FIG. 1 is shown in FIG. 2 which includes a power factor correction bank of condensers 24 connected across a condenser charging winding 25 inductively coupled with the reactance winding 15 and disposed between leg portions 1 and 5 and in surrounding relation to the movable shunt such that the shunt may extend into and be retracted from the center thereof in the same manner that the shunt is moved relatively to the reactance winding. The condenser charging winding 25 may be concentrically wound with the reactance winding and is preferably disposed beneath the reactance winding. Immediately upon striking of the welding arc, the reactance winding 15 is energized as previously explained, and since the condenser charging winding is inductively coupled with the reactance winding the condensers 24 immediately charge to their maximum value, thus enabling the welding transformer to operate as efficiently as a welding transformer having much greater open-circuit voltage and yet, at the same time, giving the advantage of a welding transformer of much lower open-circuit voltage since the condensers do not increase the open-circuit voltage of the machine. When the arc is struck, the condensers have the effect of smoothing-out the arc. The capacitors 24 act to increase or decrease the frequency of the welding current, depending upon the size and number of capacitors employed since they are part of an independent oscillating or tuned circuit consisting of the capacitance 24 and the condenser charging winding 25 and enable the operator to maintain the welding arc as constant as possible as set forth in greater detail in Patent No. 2,365,722, issued to me on December 26, 1944, for Transformer. The operation of the capacitance in the present circuit is generally similar to the capacitance in that patent, although their control by a shunt is somewhat different.

Figure 3:
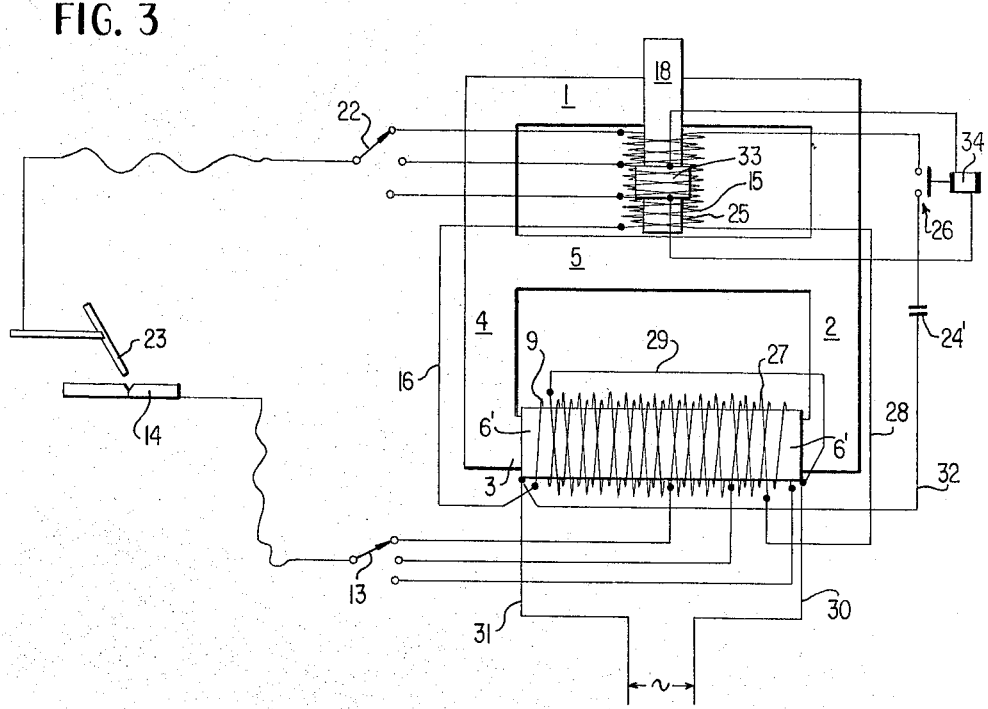
FIG. 3 is an electrical schematic diagram showing another modified form of the transformer of FIG. 1.

A further and modified form of the transformer of the invention is shown in FIG. 3 wherein the basic transformer circuit, shown in FIG. 1, remains the same with the addition of a modified form of the capacitance charging circuit. The condenser charging winding 25 is inductively connected with reactance winding 15 in the same manner as set forth in the transformer shown in FIG. 2. One end of condenser charging winding 25 is connected to a bank of capacitors 24' through solenoid switch 26. The other end of the condenser or capacitor charging winding 25 is connected to one end of a second capacitor charging winding 27 through conductor 28. Second capacitor charging winding 27 is wound on the bottom outer leg portion 3 in inductive relation with primary winding 6' and secondary winding 9. The windings are preferably concentrically wound with primary winding 6' wound on the core, secondary winding 9 wound on top of the primary and second capacitor charging winding 27 wound on top of the secondary winding. The opposite end of second capacitor charging winding 27 is connected through conductor 29 to the correspondingly opposite end of primary winding 6' and to input lead 30 connected to one terminal of the A.C. energization source. The other input lead 31, from the A.C. source, connected to the opposite end of primary winding 6' is also connected through conductor 32 to the bank of capacitors 24'. Thus the series circuit of second capacitor charging winding 27, conductor 28, capacitor charging winding 25, solenoid switch 26, the bank of capacitors 24' and conductor 32 is connected across the input leads 30 and 31 and in parallel with primary winding 6'. Since the second capacitor charging winding 27 is directly energized by the A.C. source, even when the welding circuit is not completed, it is necessary to provide the solenoid switch 26 in the capacitor charging circuit to prevent the capacitors from becoming charged before the welding arc is struck so as to maintain the benefit of a low open-circuit voltage machine.

A solenoid switch operating coil 33 is inductively coupled with reactance winding 15 and capacitor charging winding 25 and is wound about the shunt 18 in the same manner as the other windings. The coil 34 of solenoid switch 26 is connected across solenoid switch operating coil 33 which becomes energized as soon as the welding arc is struck. At the instant coil 34 energizes and closes solenoid switch 26, the bank of capacitors 24' becomes charged from the voltage of the A.C. source across input leads 30 and 31, the induced voltage in second capacitor charging winding 27 from the primary winding, and the induced voltage in capacitor charging winding 25 from the reactance winding. This arrangement from the condenser charging circuit provides a welding transformer having low open-circuit voltage with an arc which is easily struck, especially in heliarc welding. A few turns of condenser charging winding 25 about the reactance coil 15 gives an extra push to the welding arc to enable it to be struck more easily. When the welding circuit is broken, although leakage flux from the primary winding is present in the upper portion of the core there is not sufficient inductive coupling with coil 33 to maintain solenoid coil 34 energized and as a result solenoid switch 26 opens to break the capacity charging circuit and reestablish the welder as a relatively low open-circuit voltage machine.

The charge across the capacitors is related with both the secondary winding and the reactance winding when the arc is struck and the resonant characteristics of the transformer are greatly increased and this improves the performance of the welder to a high degree. The solenoid switch which includes the capacitor circuit in the primary circuit, only when the secondary is under load, prevents unnecessary heating of the transformer since the capacitors are disconnected during idle periods. The capacitor circuit makes the arc much more stable, with less sputter, and spatter, and less troublesome to the operator, particularly on overhead and vertical welding. The welder as shown in FIG. 3 produces an oscillating characteristic to the output current and voltage. It is to be noted that the connection of the second capacitor charging winding 27 with the primary winding constitutes an auto-transformer. In operation, the coarse adjustment of the current in the welding circuit is accomplished by movement of tap 22 and the fine adjustment of the current is accomplished by moving shunt member 18 inwardly and outwardly relative to intermediate leg portion 5, and at right angles thereto, and it will be noted that the shunt is also moved normal to the primary and secondary winding and that the reactance winding is connected normal to the primary and secondary windings.

Figure 4:
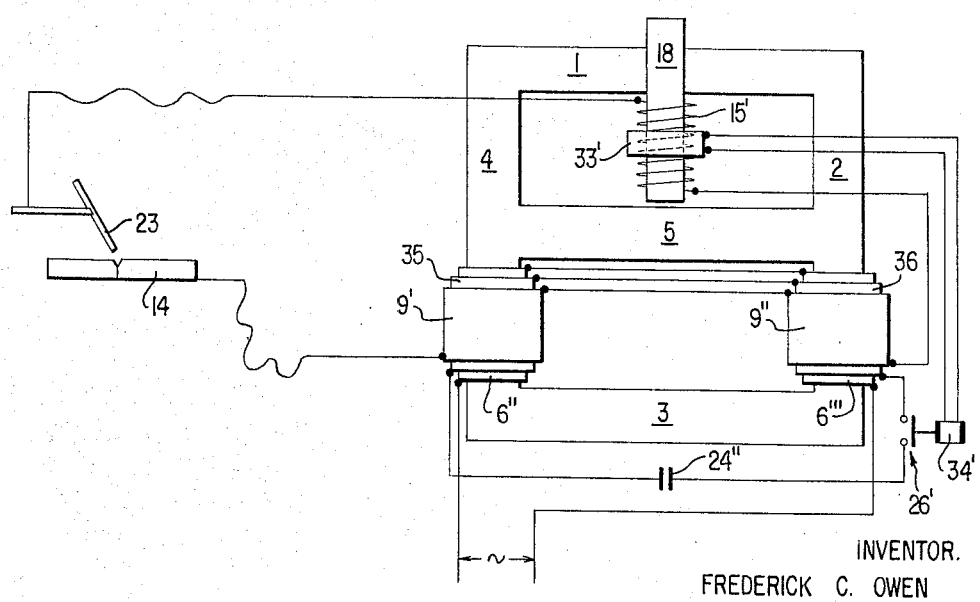
FIG. 4 is an electrical schematic diagram of a further modified form of the transformer of the invention.

A further modified form of the core type A.C. welding transformer of the invention is shown in FIG. 4 wherein the primary windings 6" and 6''' are connected in series aiding on opposite outer core leg portions 4 and 2 on one side of intermediate leg 5. In this form of the invention the reactance winding 15' is disposed parallel with the primary windings 6", 6''' and secondary windings 9', 9" rather than normal thereto as in the previous forms but the primaries still produce a flux path through the entire core in a single direction so that there is only a single mutual flux path between the primary and secondary winding, and the reactance winding. Outer core leg 3 is void of windings and secondary windings 9' and 9" are connected in series circuit with reactance winding 15', welding electrode 23 and work 14 to form the welding circuit. The secondary windings are connected on the same outer core legs as the primary windings as shown and the reactance winding is connected in surrounding relation to shunt 18 as in the previous forms, on the opposite side of intermediate leg 5, such that fine control of the output current is obtained by movement of shunt 18, once the arc is struck. Current and voltage adjustment taps, not shown, such as shown at 19–22 and 10–13 may also be provided in this form of the transformer.

The secondary windings are preferably wound concentrically on the primary windings and the copper of the primary and secondary windings is distributed over a pair of spaced outer core leg portions thus enabling the heat generated by the windings to be dissipated and radiated from the windings more quickly and more efficiently to provide a cooler operating welder.

A pair of capacitor charging windings 35 and 36, connected between the primary and secondary on each of the outer core leg portions respectively, are connected in series circuit with capacitor bank 24" and solenoid switch 26'. The coil 34' of solenoid switch 26' is connected across solenoid energizing winding 33' for energization thereby as soon as the secondary is placed under load. When solenoid switch 26' is energized it closes to complete the charging circuit of capacitors 24". Since the capacitor charging windings are inductively related directly to the primary windings the switch is necessary in the charging circuit or the capacitors would remain charged even when the transformer was idling which would cause unnecessary heating of the transformer and an unnecessarily high open-circuit voltage. Coil 33' and solenoid switch 26' automatically place the capacitors in the circuit to improve the arc characteristics only when the arc is struck.

Figure 5:
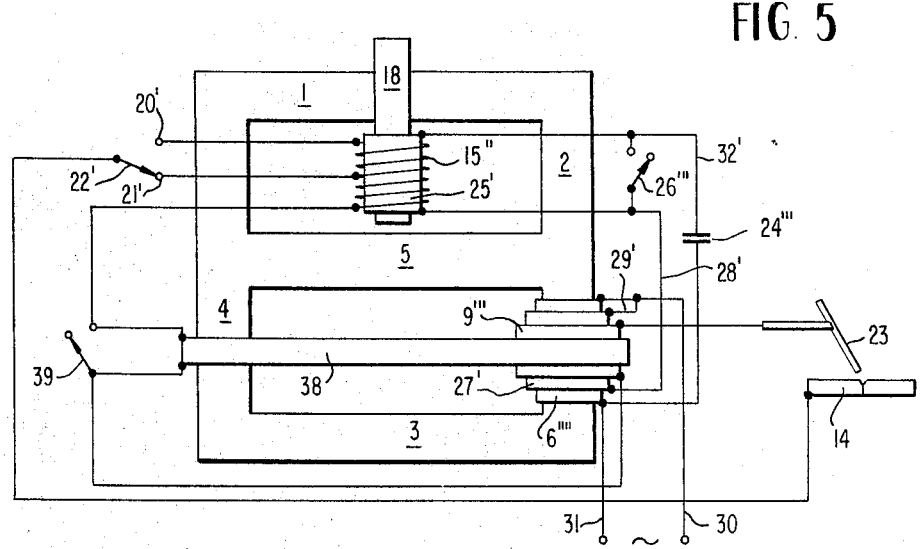
FIG. 5 is an electrical schematic diagram of a modified form of the invention shown in FIG. 4.
Figure 6:
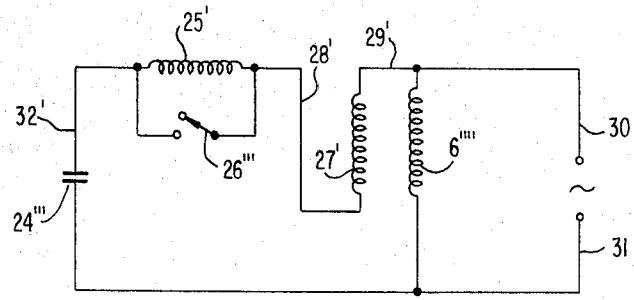
FIG. 6 is an electrical schematic of the primary electrical circuit of the transformer of FIG. 5.
Figure 7:
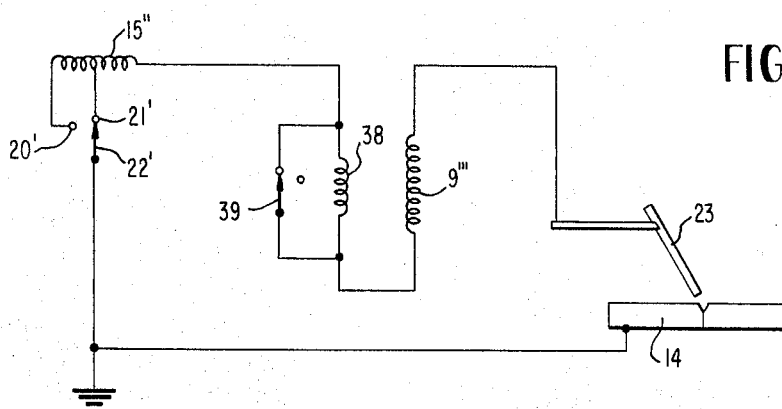
FIG. 7 is an electrical schematic of the secondary electrical circuit of the welding transformer of FIG. 5.

Still a further modified form of the core type A.-C. welding transformer of the invention is shown in FIGS. 5–7, wherein the primary and secondary windings are disposed on the transformer core in generally the same manner as the primary and secondary windings in the transformer of FIG. 4. The primary circuit of the welding transformer shown in FIG. 6 is substantially the same as the primary circuit of the welding transformer shown in FIG. 3, with the exception of the placement of switch 26''', and the secondary welding circuit shown in FIG. 7 is substantially the same as the secondary welding circuits of the transformers of FIGS. 3 and 4 with the addition of second secondary winding or perimeter winding 38 connected in the series circuit.

The welding transformer of FIG. 5 is designed to do all types of welding, such as straight polarity high-heat steel welding, reversed polarity high-heat steel welding and heliarc welding with voltages less than 80 open-circuit volts without the use of devices such as relays, high frequency spark to start the arc and to maintain it while welding, and the like, as employed by other welding transformers on the commercial market. The use of the second secondary or perimeter type winding 38 has enabled the elimination of the mentioned additional devices usually employed.

Referring to FIGS. 5 and 6 of the drawings, the primary circuit of the welder includes a condenser charging winding 25' connected to a bank of capacitors 24''' through conductor 32'. The condenser or capacitor charging winding 25' is inductively related to reactance winding 15" and is connected substantially in the same manner about adjustable shunt 18 as the corresponding elements in the welding transformer of FIG. 3. The opposite end of capacitor charging winding 25' is connected through conductor 28' to one end of a second capacitor charging winding 27' wound on outer leg portion 2 with primary winding 6'''' and secondary winding 9''' substantially normal to intermediate leg 5 and in inductive relation with the primary and secondary windings. The windings are preferably concentrically wound. The opposite end of second capacitor charging winding 27' is connected through conductor 29' to the correspondingly opposite end of primary winding 6'''' and to input lead 30 connected to one terminal of an A.-C. source, such as a 220 volt, 60 cycle A.-C. source. The other input lead 31 from the source is connected to the opposite end of primary winding 6'''' and to the opposite side of the bank of capacitors 24'''. The primary circuit thus consists of a series circuit of second capacitor charging winding 27', conductor 28', capacitor charging winding 25', conductor 32' and the bank of capacitors 24''' connected across input leads 30 and 31 and connected in parallel with primary winding 6''''. A switch 26''' having an open and a closed position is connected in shunt with capacitor charging winding 25' to eliminate this winding from the circuit in closed position and effectively jumper conductors 28' and 32'. This switch then controls the charge on the bank of capacitors.

The secondary or welding circuit of the welding transformer of FIG. 5 is specifically shown in FIG. 7 and consists of main secondary winding 9''' connected on one end to welding electrode 23 and on the opposite end to one end of second secondary winding 38 which extends about the perimeter of the generally rectangular core of the transformer, that is, this winding is wound about the outer extremities of outer core leg portions 2 and 4 and preferably on top of the concentrically wound windings 6'''', 27' and 9''', and thus inductively related thereto. Second secondary winding 38 is thus positioned to intersect the lines of flux from the primary winding, the second capacitor charging winding and the flux in core leg portions 2 and 4 as well as the flux from main secondary winding 9''' when the welding circuit is completed. The opposite end of second secondary winding 38 is connected to one end of reactance coil 15''. A plug or switch 22' is selectively movable into connection with taps 20' and 21' to connect the desired number of turns of reactance coil 15'' in the welding circuit and to the work 14. The welding circuit is completed when the arc is struck between welding electrode 23 and the work 14. A bypass switch 39 having an open and closed position is connected across the ends of second secondary winding 38 and is adapted to shunt the winding in a closed position and effectively remove it from the welding circuit when a reduction in the welding current is desired.

Current selection for particular work requirements is obtained in the same manner as described in the other forms of the invention by adjustment of shunt 18. By way of example when welding ferrous metals, switch 26''' is normally open, bypass switch 39 is normally closed, and plug 22' is connected with tap 21' for high heat or with tap 20' for low heat in the welding circuit. When welding non-ferrous metals, such as in heliarc welding, switch 26''' is in a normally closed position and bypass switch 39 is open, while plug 22' is preferably connected with tap 21'.

It is a striking characteristic of the welding transformer of FIG. 5 that there is substantially constant power in the welding arc. The design of the welding machine by utilizing the perimeter winding 38 and the capacitor charging windings 25' and 27' with the capacitor bank 24''' provides the welder with the capacity of compensating for voltage changes and load changes to meet the requirement of a constant output in the welding circuit under conditions of varying voltage and load. The combination produces a steady current and causes the output current wave to be in phase with the maximum values of output voltage and this has the effect of greatly increasing the efficiency of the machine. By observing the output under varying load conditions with an oscilloscope it can be seen that the waveforms are very steady and oscillogram comparisons show how closely the maximum values of current occur at times of maximum values of voltage. The combination of compensating features of the reactance coil and perimeter winding, as well as the capacitor charging winding, produces a compensating negative feedback in the circuitry which produces greatly improved uniformity in the weld due to the compensation this feature provides for voltage and load current variations. While this welder is not a D.C. machine the mentioned arrangement of winding and the bank of capacitors serve to simulate a D.C. output, since the voltage output waveform is pulse-like and not symmetrical. This exists together with a symmetrical current waveform closely in phase therewith. The product is a measure of power output and the efficiency is increased under synchronous pulse conditions.

The transformer of FIG. 5 has been constructed and tested and found to be very efficient. In one form of the transformer the coils may have the following number of turns with a capacitor bank of 7 x 45 microfarads:

| Winding: | Turns |
|---|---|
| Primary Winding 6'''' | 144 |
| Second Capacitor Charging Winding 27' | 108 |
| Capacitor Charging Winding 25' | 58 |
| Main Secondary Winding 9''' | 50 |
| Second Secondary Winding 38 | 10 |
| Reactance Winding 15'' | |
| Tap 21' | 18 |
| Tap 20' | 45 |

While the invention has been described in certain preferred embodiments it is realized that modifications can be made without departing from the spirit of the invention and it is to be understood that no limitations upon the invention are intended other than those imposed by the scope of the appended claims.

What I claim as new and desire to secure by Letters Patent of the United States, is as follows:

1. A welding transformer of the core type comprising a generally rectangular core comprised of outer core legs with an intermediate leg connected transverse of one pair of said outer core legs, inductively coupled primary and secondary windings on one outer core leg of said rectangular core on one side of said intermediate leg, said primary winding adapted to produce an A.C. flux through the outer core legs and said intermediate leg of said rectangular core, a gap in the outer core leg on the opposite side of and parallel with said intermediate leg, said gap disposed normal to said intermediate leg, a flux diverter connected in said gap for movement normal to and toward and away from said intermediate leg, a reactance winding connected about said flux diverter between said gap and intermediate leg, a welding circuit including said secondary winding and said reactance winding connected in series, and said flux diverter connected for movement through said reactance winding to vary the A.C. flux in said core and the current in the welding circuit when the welding arc is struck.

2. A welding transformer as set forth in claim 1 in which said reactance winding is disposed normal to said primary and secondary windings.

3. A welding transformer of the core type comprising a generally rectangular core comprised of outer core legs with an intermediate leg connected transverse thereof, inductively coupled primary and secondary windings on one outer core leg parallel to said intermediate leg, a gap in the outer core leg on the opposite side of said intermediate leg from said primary and secondary windings, flux diverter means connected in said gap for movement transversely of and between the outer core leg having the gap and said intermediate leg, a reactance winding connected between said intermediate leg and the outer core leg having the gap and about said flux diverter means, and said reactance winding and said secondary winding connected in a series welding circuit, whereby upon energization of said primary winding a flux path is established through the entire core and upon completion of the welding circuit the current thereof is varied by movement of said flux diverter means.

4. A core type welding transformer comprising a generally rectangular core formed of outer core legs and a single intermediate leg connected transversely of the core, a primary winding on an outer core leg on one side of said intermediate leg to produce a magnetic flux through the outer core legs and in one direction in said single intermediate leg, a secondary winding inductively coupled with said primary winding on the same outer core leg, a gap in another of said outer core legs on the opposite side of said intermediate leg, said gap disposed normal to said intermediate leg, a shunt member connected in said gap for movement normal to said intermediate leg and toward and away therefrom, a reactance winding connected about said shunt between said gap and intermediate leg with said shunt movable relative thereto, a welding circuit including said secondary winding and said reactance winding, and said reactance winding connected to produce magnetic flux in one end of the core and said intermediate leg upon completion of the welding circuit, whereby movement of said shunt toward said intermediate leg reduces the current in the welding circuit and movement of said shunt away from said intermediate leg increases the current in the welding circuit.

5. A core type welding transfomer as set forth in claim 4 in which said primary and secondary windings are disposed on an outer core leg at right angles to said intermediate leg.

6. A core type welding transformer as set forth in claim 4 in which said primary and secondary windings are on the outer core legs only.

7. A core type welding transformer as set forth in claim 4 which said reactance winding includes a plurality of turn selection taps, switch means in said welding circuit for selective connection with said taps whereby connection with a tap for placement of fewer turns of said reactance winding in said circuit increases the current of said circuit.

8. A core type welding transformer as set forth in claim 5 including a second primary and a second secondary winding connected on an outer core leg opposite the first mentioned primary and secondary windings on the same side of and at right angles to said intermediate leg.

9. A core type welding transformer as set forth in claim 4 including a reactance of a character to materially improve the power factor, and an energizing winding for the reactance inductively related to said reactance winding and connected about said shunt to automatically render the reactance effective only when said welding circuit is completed.

10. A core type welding transformer as set forth in claim 9 including switch means connected in circuit with said reactance and said energizing winding, and a second energizing winding connected about said shunt and inductively related to said first mentioned energizing winding and connected to close said switch means and connect said reactance to said energizing winding when said welding circuit is completed.

11. A core type welding transformer as set forth in claim 10 including a third energizing winding connected to form a series circuit with said first mentioned energizing winding, said switch, and said reactance, said series circuit connected with said primary winding forming an autotransformer.

12. A core type welding transformer as set forth in claim 4 in which said primary and secondary windings are disposed on an outer core leg at right angles to said intermediate leg, and a second secondary winding connected in said welding circuit in series with said reactance winding and said secondary winding, and said second secondary winding connected about opposite outer core legs of the generally rectangular core which extend at right angles to said intermediate leg including the outer core leg on which said primary and secondary windings are disposed.

13. A core type welding transformer as set forth in claim 12 including a reactance of a character to materially improve the power factor, a first energizing winding for the reactance inductively related to said reactance winding and connected about said shunt, and a second energizing winding for the reactance connected on the outer core leg with said primary and secondary windings and inductively related thereto, and said reactance and first and second energizing windings connected in series circuit across said primary winding.

14. A core type welding transformer as set forth in claim 12 in which said second secondary winding is connected outwardly of the extremities of the rectangular core and is wound about an axis disposed normal to said intermediate leg.

References Cited by the Examiner

UNITED STATES PATENTS

| | | | |
|---|---|---|---|
| 2,136,863 | 11/1938 | Owen | 323—48 X |
| 3,147,455 | 9/1964 | Owen | 323—56 X |
| 3,185,917 | 5/1965 | Owen | 323—45 |
| 3,188,552 | 6/1965 | Owen | 323—48 |
| 3,219,881 | 11/1965 | Rudaz | 323—51 X |

JOHN F. COUCH, Primary Examiner.

W. E. RAY, Assistant Examiner.